Nov. 1, 1949     R. S. TAYLOR ET AL     2,487,001
AMMONIA REFRIGERATING APPARATUS

Filed April 6, 1946     3 Sheets-Sheet 1

INVENTORS
Robert S. Taylor
Bernard A. Daley
BY D. E. Heath
their Attorney

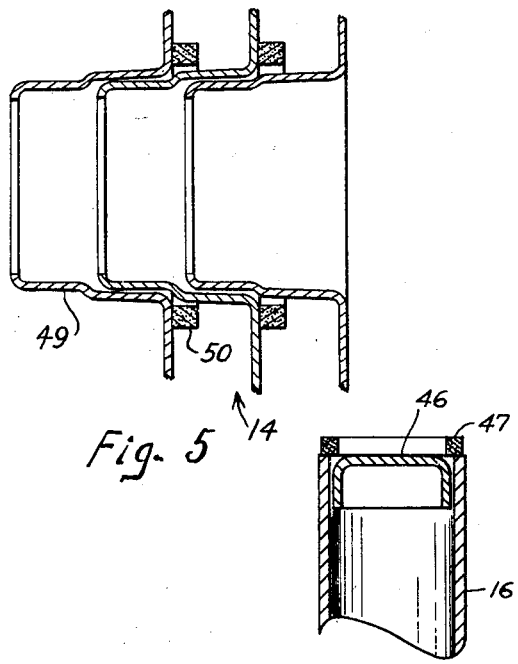
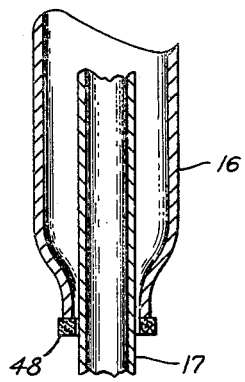
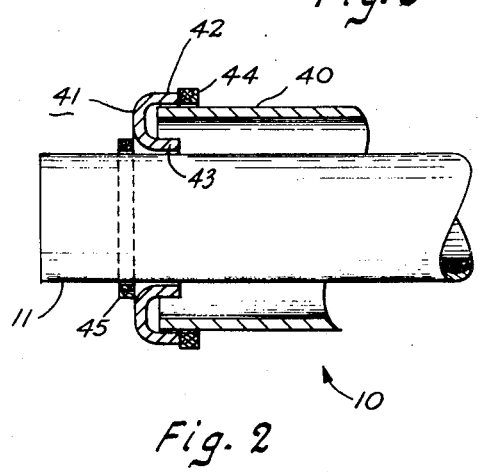
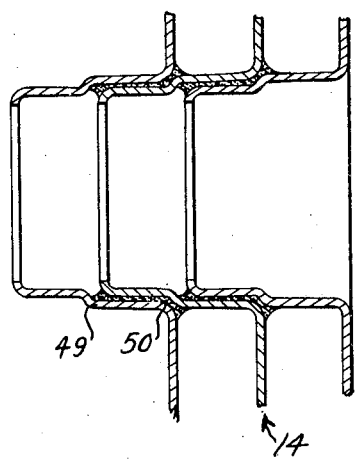

Nov. 1, 1949   R. S. TAYLOR ET AL   2,487,001
AMMONIA REFRIGERATING APPARATUS
Filed April 6, 1946   3 Sheets-Sheet 3

INVENTORS
Robert S. Taylor
Bernard A. Daley
BY
D. E. Heath
Their Attorney

__Patented Nov. 1, 1949__

2,487,001

UNITED STATES PATENT OFFICE 2,487,001

AMMONIA REFRIGERATING APPARATUS

Robert S. Taylor, Evansville, and Bernard A. Daley, Scott Township, Vanderburgh County, Ind., assignors to Servel, Inc., New York, N. Y., a corporation of Delaware Application April 6, 1946, Serial No. 660,126

1 Claim. (Cl. 62—1)

Our invention relates to iron refrigeration apparatus.

Such apparatus is constructed of iron or steel tubing and vessels joined together by an electric arc or a torch welding process or both. These processes require considerable work in testing for leaks and internal obstruction, and considerable work in handling and rewelding to correct leaks and occasional internal obstruction.

The object of our invention is to provide a new refrigeration apparatus of iron or steel and of which the various parts are joined together in a structurally strong and inherently leak proof manner. This is accomplished by so forming the parts as to be joined in a special manner and bonding the joints by a ferrous material but by a process which inherently effects a complete seal.

It is a matter of general knowledge that eutectic mixtures or metals containing a melting point depressant are useful in various applications as a solder or sealing material as, for instance, an iron and phosphorus mixture for sealing metal vacuum tubes. Also a matter of general knowledge is the use of copper in making a brazed joint in a reducing atmosphere. When the temperature is raised, the copper flows by capillarity and moves not only into the space between the parts being joined but also penetrates the iron or steel parts being joined, thus effecting a tight and structurally strong joint. This so-called hydrogen brazing could not be used for refrigeration apparatus employing aqueous ammonia due to its chemical activity with respect to copper, nor for apparatus subject to electrolytic corrosion. This appears to be one reason why brazing has never been considered feasible for iron refrigeration apparatus. Also, since such apparatus utilizing ammonia has high internal pressures, mixtures such as iron and phosphorus have apparently been dismissed on account of brittleness ordinarily encountered when phosphorus is combined with iron.

We have found that iron containing phosphorus can be utilized for joining and sealing iron refrigeration apparatus, provided the apparatus is so formed that deformation under internal pressure or external application of force occurs in wall structure of joined parts before such occurrence in the joints, and the alloy is of certain proportions and properly applied under certain temperature conditions. A satisfactory alloy is one consisting of iron containing phosphorus in a range from 9 to 15 per cent, this range including the first eutectic which is about 10.2 per cent.

Strangely, unlike copper or any other known iron brazing material the iron-phosphorus alloy is self fluxing and can be used in the presence of oxygen.

Our invention is more fully described by reference to the accompanying drawings of which:

Fig. 1 is a more or less schematic illustration of an ammonia refrigerating apparatus embodying the invention:

Figs. 2, 3, 4, 5, and 7 are detail sectional views of certain joints in the apparatus of Fig. 1 before brazing;

Fig. 6 is a detail sectional view of the joints of Fig. 5 after brazing;

Figure 1:
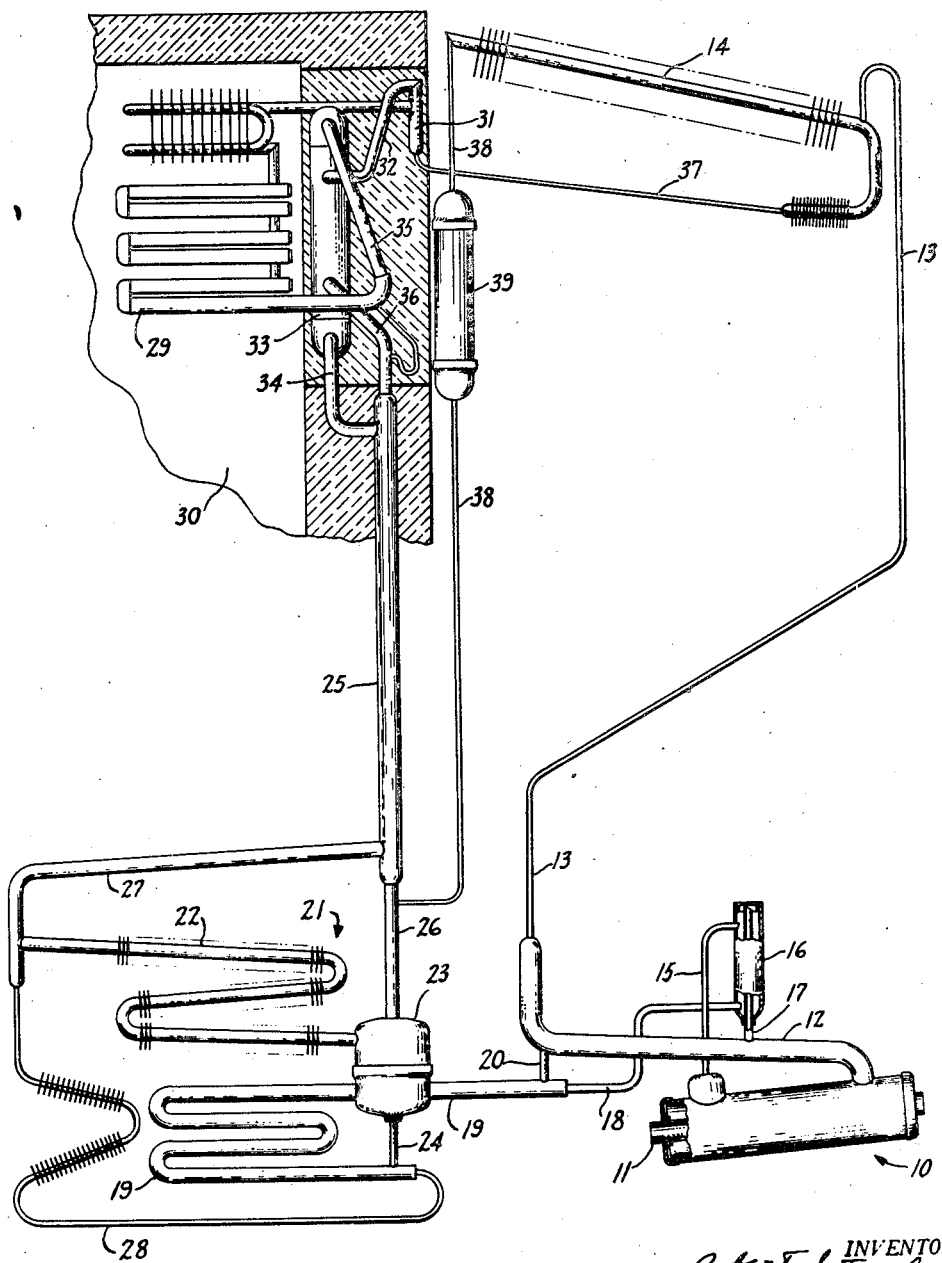

Referring to Fig. 1 of the drawings, a generator 10 has a heating flue 11. A suitable burner, not shown, is arranged so that its flame projects into the lower end of the flue 11. The lower end of a rectifier or analyzer pipe 12 is connected to the generator 10. The upper end of the pipe 12 is connected by a conduit 13 to a finned condenser pipe 14. The generator 10 is connected by a vapor lift pipe 15 to a separating vessel 16. The upper part of the vessel 16 is connected by a pipe 17 to the rectifier 12. The lower part of the vessel 16 is connected by a conduit 18 to one passage of a liquid heat exchanger 19. The other passage of the liquid heat exchanger 19 is connected by a conduit 20 to the rectifier 12.

An absorber 21 comprises a finned pipe coil 22 and a storage vessel 23. The adsorber vessel 23 is connected to the liquid heat exchanger 19 by a pipe 24, and to the gas heat exchanger 25 by a pipe 26. The absorber coil 22 is connected by a pipe 27 to the gas heat exchanger 25. The absorber coil is also connected by a portion of pipe 27 and a pipe 28 to the liquid heat exchanger 19.

A pipe coil type of evaporator 29 is located in an insulated refrigerator storage compartment 30. The upper end of the evaporator 29 is connected by a pipe 31, a pipe 32, a gas heat exchanger 33, a pipe 34, the gas heat exchanger 25, and the pipe 27 to the upper end of the absorber coil 22. The lower end of the evaporator 29 is connected by a pipe 35, the gas heat exchanger 33, a pipe 36, the gas heat exchanger 25, and the pipe 26 to the absorber vessel 23.

The lower end of the condenser 14 is connected by a pipe 37 to the pipe 31 which communicates with the upper end of the evaporator 29. The condenser 14 is provided with a vent pipe 38 which is connected from the high point of the condenser to the pipe 26. A gas storage vessel 39 is connected in the vent pipe 38.

The previously described parts are formed of various sizes of steel tubing secured together in the manner of the present invention. The system is evacuated and charged with a water solution of ammonia, and hydrogen gas. The solution fills the lower part of the apparatus to a level just below the connection of the absorber tube 22 to the absorber vessel 23. The gas occupies that part of the system above the level of solution therein.

In operation, heat is applied to the generator 10. As known, this application of heat may be thermostatically controlled by a temperature condition affected by the evaporator 29. Ammonia vapor is expelled from solution in the generator 10. Some of the vapor flows from the generator through the rectifier 12 and the pipe 13 to the condenser 14. Some of the vapor rises through pipe 15 causing lifting of liquid through this pipe into the vessel 16. This lifting or pumping vapor flows from the vessel 16 through the pipe 17 into the rectifier 12 and thence through the pipe 13 to the condenser 14.

The vapor in the condenser 14 condenses to liquid which flows from the lower end of the condenser pipe through the pipe 37 and the pipe 31 into the upper end of the evaporator 29. The liquid ammonia vaporizes in the evaporator 29, producing a refrigerating effect for cooling the refrigerator compartment 30. The ammonia vapor formed in the evaporator 29 diffuses into the hydrogen atmosphere, and the resulting mixture of hydrogen and ammonia vapor flows from the upper end of the evaporator 29 through the pipes 31 and 32, the gas heat exchanger 33, the pipe 36, the gas heat exchanger 25, the pipe 26, and the upper part of the vessel 23 into the absorber tube 22.

Weakened absorption liquid from the generator separating vessel 16 flows through the pipe 18, the liquid heat exchanger 19, the pipe 28, and the lower end of the pipe 27 into the upper end of the absorber tube 22. The absorption liquid flows downward through the pipe 22 into the absorber vessel 23. The liquid absorbs ammonia vapor in the pipe 22 and the resulting enriched solution flows from the absorber vessel 23 through the pipe 24, the liquid heat exchanger 19, the pipe 20, and the rectifier 12 to the generator 10. The weak gas flows from the absorber tube 22 through the pipe 27, the gas heat exchanger 25, the pipe 34, the gas heat exchanger 33, and the pipe 35 to the lower end of the evaporator 29.

Non-condensible gas flows from the condenser 14 through the vent pipe 38 to the previously described gas circuit. The vessel 39 in the vent pipe 38 provides for a reserve quantity of hydrogen which upon increase in pressure in the system under high temperature conditions is displaced by ammonia vapor from the condenser 14, the displaced gas flowing into the gas circuit so that refrigeration continues under the higher pressure conditions without breathing of ammonia vapor into the gas circuit.

Fig. 2 is an enlarged sectional view illustrating how an end of the generator 10 is fabricated. The flue pipe 11 is located concentrically within a casing tube 40. The flue pipe projects beyond the end of the casing tube. An end plate 41 has one portion 42 which overlaps the end of the casing tube 40, and another portion 43 which forms a sleeve around the flue pipe 11. The portion 42 of the end plate 41 overlaps and in effect also forms a sleeve over the end of the casing tube 40. These lapped or sleeve joints are a characteristic of the present invention. Although for the purpose of clarity the drawing indicates considerable clearance, the joints should be between a force fit and a .015 inch clearance. The same applies to all of the joints in the subject apparatus. With a joint of this character the walls of the apparatus parts, such as wall 40 or the flue pipe 11, would deform under internal pressure or external application of force before such occurrence at the double wall joint. A ring 44 of brazing metal is located around the casing tube 40 adjacent the sleeve joint between this casing and the plate portion 42. Another ring 45 of brazing material is located on the flue pipe 11 next the sleeve joint between the flue pipe and the end plate portion 43.

The brazing rings 44 and 45 are made in accordance with an invention of B. A. Daley described in his co-pending application Serial No. 660,188 filed concurrently herewith. This type of brazing ring is made by a process generally known in powder metallurgy and consists in compacting the ring from constituents in powder form. The brazing ring is an iron-phosphorus composition of 9 per cent phosphorus. The temperature at the joint is raised to a value between 2050° F. to 2100° F., this being above the melting temperature of the brazing material, and below the melting point of the iron. The material of the brazing ring melts and distributes itself by capillarity throughout the face area of each lapped or sleeve joint, and forms a fillet at each edge of the joint, as hereinafter described in connection with Figs. 5 and 6.

Fig. 3 is an enlarged sectional view illustrating how the top of the separating vessel 16 is fabricated. An inverted cup 46 is fitted in the upper end of a tube forming the vessel 16, the side wall of the cup 46 and the wall of the tube 16 forming a lapped or sleeve type joint. A ring 47 of brazing material is shown located next one edge of the sleeve joint so that when the temperature is increased to the melting point of the brazing material it will flow into the joint and be distributed throughout the joint by capillarity.

Fig. 4 is an enlarged sectional view illustrating how the lower end of the separating vessel 16 is formed. The pipe 17 projects upward concentrically within the tube 16. The lower end of the tube 16 is drawn or otherwise suitably formed into a neck which forms a sleeve joint with the pipe 17. A ring 48 of brazing material is shown located adjacent the lower edge of this sleeve joint. Upon increase in temperature, the material of the ring 48 melts and flows by capillarity throughout the joint.

Fig. 5 is an enlarged sectional view illustrating how a section of the condenser pipe 14 and the absorber pipe 22 is fabricated. The condenser pipe 14 is made up of a plurality of nested cups 49, the rims of these cups forming the heat radiation fins. The nested cups 49 form a series of sleeve joints adjacent each of which there is located a ring 50 of brazing material. When the temperature is raised above the melting point of the brazing material, the latter flows by capillarity throughout each sleeve joint forming a thin film of bonding material in the joint and a fillet around each edge of the joint. The film of bonding metal thus formed is shown in disproportionately large section in Fig. 6, being there indicated by the reference numeral 51.

Figure 7:
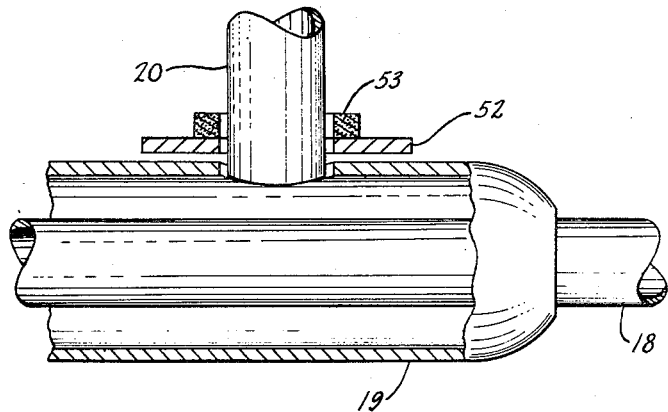
Figure 8:
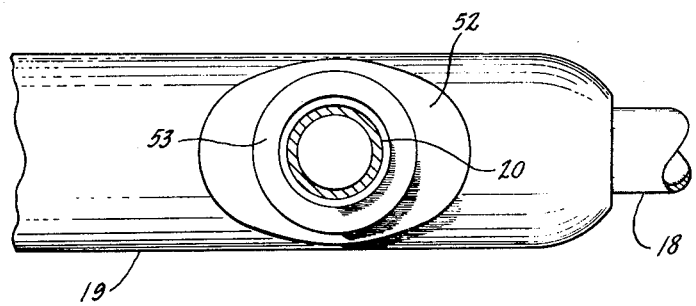
Fig. 8 is a plan view of Fig. 7.

Fig. 7 is an enlarged sectional view illustrating how a joint like that between the liquid heat exchanger 19 and the pipe 20 is made. The lower end of the pipe 20 projects into a hole in the outside tube of the heat exchanger 19. An annular plate 52 surrounds the pipe 20 and is formed to lie flat against the outer surface of the heat exchanger 19. For purposes of description the clearances are exaggerated in the drawing, but the parts 19, 20, and 52 fit snugly, with tolerances between a force fit and a .015 inch clearance. Thus constructed and arranged, these parts so reinforce each other at the joint that deformation under internal pressure or external application of force must first occur in wall portions other than those at the joint. This construction and arrangement also provides a joint which is capillary to the molten iron-phosphorus composition. This composition is provided in the form of a ring 53 located around the pipe 20 on top of the washer 52 as may be seen in Fig. 7 and the top view Fig. 8. When the temperature is raised above the melting point of the iron-phosphorus composition it flows into the capillary regions between the iron parts 19, 20, and 52, and distributes itself by capillarity throughout these regions forming a film, illustrated in enlarged cross section in Fig. 9, which projects as a dispersion in the metal of the contiguous wall surfaces of the parts 19, 20, and 52.

Figure 9:
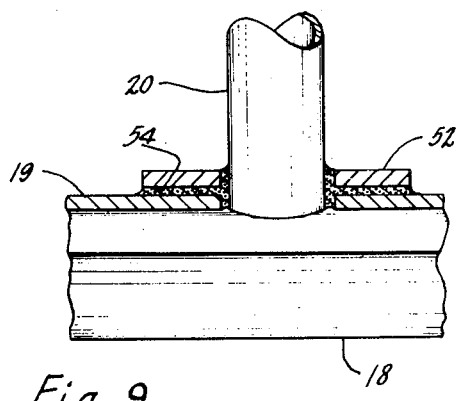
Fig. 9 is a view like Fig. 7 showing the joint after brazing.

A few of the joints in the apparatus have been described in detail to illustrate how the invention is carried out. It will now be understood that all of the joints have to be specially formed in the practice of this invention. A principal requirement of the special formation is the lap or sleeve type of relationship between the parts being joined, and a relatively tight fit for the purpose of causing both reinforcement against deformation at the joint and complete distribution of the bonding material throughout the joint by capillarity. The appearance of a fillet completely around each edge of the joint, as may be seen in Figs. 6 and 9, is an indication of a perfect seal. This is highly significant and constitutes a big step forward in ammonia refrigerating apparatus. This is the reason. When the iron parts are joined by a torch welding operation, each joint is made by building up a body of iron for sealing the joint and joining togeher the adjacent iron parts. A welded joint, the only fusion type of joint heretofore known in iron refrigerating apparatus, requires human skill and control and is therefore subject to leaking and requires considerable work in testing for leaks, and rewelding. After rewelding to correct a leaky joint, testing is again necessary, and this process of rewelding and leak testing is repeated until all units have satisfactorily passed the leak test. This is a considerable item of cost which is reflected in the price of such product paid by the public. The value of the present invention is not that it decreases the amount of cost occasioned by leak testing, but that it completely eliminates the necessity for leak testing. It has been found that a joint made in accordance with this invention does not leak, nor do any of a hundred joints leak.

Applying iron-phosphorus brazing material of 9 per cent phosphorus, joints have been made in ammonia refrigerating apparatus which withstand over 2500 lbs. per sq. in. internal pressure and remain leak proof. The brazing temperature using such material is preferably between 2050° F. and 2100° F. Photomicrographs of joints made under these conditions show there is dispersion of the bonding material into the contiguous walls of the joined parts. Such micrographs also show that the bonding material forms a film that is an unbroken solid throughout the joint area. Thus it is that such a joint has such strength and is leak proof.

Although we have described a specific form of brazing ring, it should be understood that the brazing material can be applied in other ways. For instance, powdered alloy can be mixed with a binder to form a paste, or the powder can be retained in a sac of ash free material such as pyroxylin or other nitrocellulose lacquer. It can be made in the form of pellets or tablets for application to a joint, because, if the joint is properly formed, the material flows throughout the joint by capillarity when the melting point of the material is exceeded. The ring formed is of course highly advantageous in quantity production.

Various other modifications and changes may be made within the scope of the invention as set forth in the following claim.

We claim:

Ammonia refrigeration apparatus comprising iron parts joined together and having walls constructed and arranged to so mutually reinforce the joint forming portions thereof that deformation under fluid pressure or other application of force must first occur in other portions thereof, the joints being capillary to molten iron-phosphorus composition at a temperature above the melting point of the composition and below the melting point of the iron parts, and sealed by such composition in solid phase in the form of a film in each capillary region projecting as a dispersion in the metal of the contiguous wall portions.

ROBERT S. TAYLOR.
BERNARD A. DALEY.

REFERENCES CITED

The following references are of record in the file of this patent:

UNITED STATES PATENTS

| Number | Name | Date |
|---|---|---|
| 2,091,584 | Brown | Aug. 31, 1937 |
| 2,338,277 | Ashby | Jan. 4, 1944 |
| 2,386,889 | Furry | Oct. 16, 1945 |